United States Patent
Stolpman

(10) Patent No.: US 7,746,758 B2
(45) Date of Patent: Jun. 29, 2010

(54) ORTHOGONAL-FREQUENCY-DIVISION-MULTIPLEX-PACKET-AGGREGATION (OFDM-PA) FOR WIRELESS NETWORK SYSTEMS USING ERROR-CORRECTING CODES

(75) Inventor: Victor J. Stolpman, Dallas, TX (US)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 11/632,359

(22) PCT Filed: Aug. 17, 2004

(86) PCT No.: PCT/US2004/027040

§ 371 (c)(1), (2), (4) Date: Jan. 12, 2007

(87) PCT Pub. No.: WO2006/022727

PCT Pub. Date: Mar. 2, 2006

(65) Prior Publication Data

US 2008/0019263 A1 Jan. 24, 2008

(51) Int. Cl.
*H04J 11/00* (2006.01)

(52) U.S. Cl. .................................................. 370/203

(58) Field of Classification Search .................. None
See application file for complete search history.

(56) References Cited

U.S. PATENT DOCUMENTS

| | | | |
|---|---|---|---|
| 5,596,604 A | 1/1997 | Cioffi et al. | 345/260 |
| 5,610,908 A | 3/1997 | Shelswell et al. | 370/210 |
| 6,618,367 B1 | 9/2003 | Riazi et al. | 370/347 |
| 6,747,948 B1 | 6/2004 | Sarraf et al. | 370/210 |
| 2002/0054632 A1 | 5/2002 | Chuang et al. | 375/224 |
| 2003/0235149 A1 | 12/2003 | Chan et al. | 370/206 |
| 2005/0015703 A1* | 1/2005 | Terry et al. | 714/776 |
| 2005/0237992 A1* | 10/2005 | Mishra et al. | 370/349 |
| 2007/0121482 A1* | 5/2007 | Kurobe et al. | 370/204 |

* cited by examiner

*Primary Examiner*—Min Jung
(74) *Attorney, Agent, or Firm*—Harrington & Smith

(57) ABSTRACT

A multiple-access communications downlink uses OFDM and error-correcting codes to send data to multiple terminals from a single access point, in which packets of message information for multiple users are aggregated and encoded into a single error-correction codeword, in which assigned time slots corresponding to specific OFDM symbols are used to separate different users, so that a near-capacity achieving channel coding system constructs a single codeword for use with iterative decoding architectures at the mobile terminals.

28 Claims, 9 Drawing Sheets

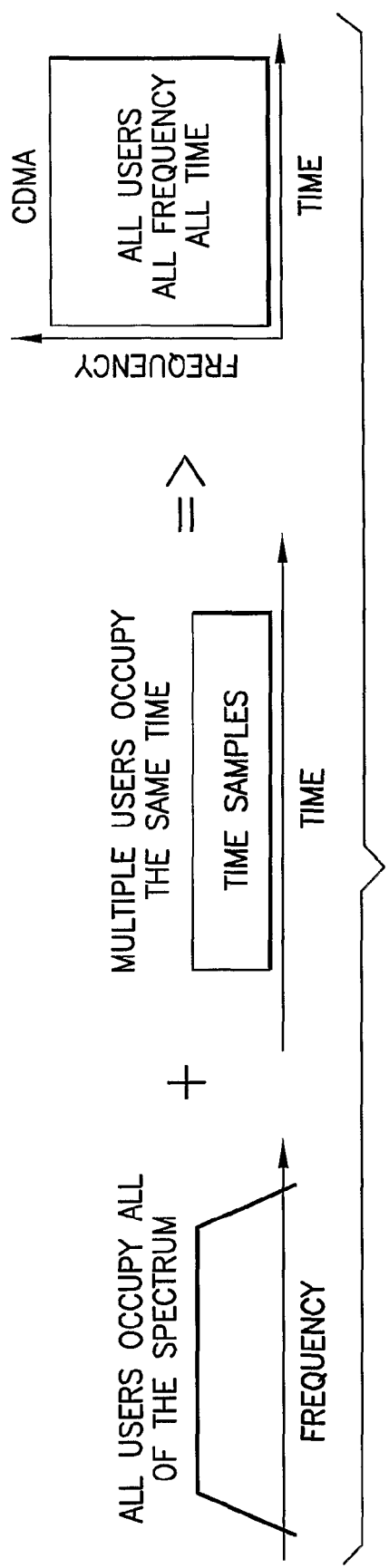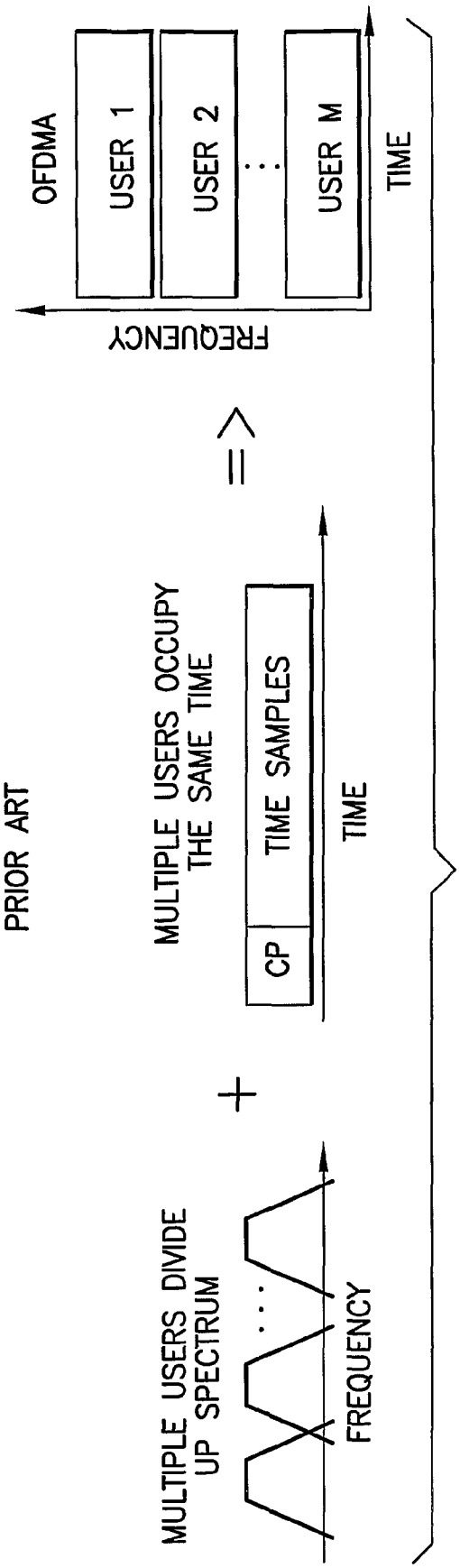

ORTHOGONAL-FREQUENCY-DIVISION-MULTIPLEX-PACKET-AGGREGATION (OFDM-PA) FOR WIRELESS NETWORK SYSTEMS USING ERROR-CORRECTING CODES

TECHNICAL FIELD

The field of the invention is wireless communication networks; in particular networks servicing multiple users simultaneously using Orthogonal-Frequency-Division-Multiplex (OFDM) signaling, that use near-capacity achieving error-correcting codes in iterative decoding structures.

BACKGROUND OF THE INVENTION

The problem addressed by the invention is the design of the downlink of a multi-access wireless network system utilizing full frequency and spatial diversity for each intended user while taking advantage of error correction coding techniques that employ iterative decoding architectures. In particular, the signaling content sent to all users by the Access-Point (AP) occupies the entire physical bandwidth during the same period of transmission (i.e. spread across all sub-carriers of an OFDM symbol).

The term AP is general and applies to many fields. In the particular case of wireless telecommunications, APs are also referred to as base stations.

Previous work has employed wireless network systems based on Code-Division-Multiple-Access (CDMA); in particular, Direct-Sequence CDMA (DS-CDMA) communication systems. FIG. 1 illustrates a typical DS-CDMA system in which each user is assigned a chip sequence (also referred to as a spreading code), $w_i$ for i=1, 2, ..., M (where M is the length of the sequence and also the maximum number of users), that is ideally pair-wise orthogonal to all other spreading codes that may be used by other users, i.e.

$$w_i^T w_j = \begin{cases} 1 & \text{for } i = j \\ 0 & \text{for } i \neq j \end{cases}.$$

Then, the AP based on DS-CDMA modulates each user's data with the corresponding spreading code in a scalar fashion using points from a constellation constructed from the respective user's data and adds chip-by-chip the results prior to transmission to all users included in this operation (see FIG. 1). The AP transmits this sequence of sums one chip period at a time (spreading the users' data over time) in synchronized periodic intervals to all users. Each user then uses a match filter (known by those skilled in the art) based on its assigned chip sequence to remove the modulated spreading codes of all other users. This is possible because each user's signal space exists in an orthogonal dimension. Using the output of the match filter, the user then decodes the information modulated in the transmitted constellation point.

FIG. 1A illustrates in simplified form a typical base station, in which a set of modules 110-1 to 110-M encodes the data being transmitted by the user, using a code such as an LDPC turbo code that has an error-correcting feature that permits the receiving station to correct for errors generated in the channel.

Next in sequence, the codewords that are the output of each encoder are optionally interleaved (on a bit or symbol basis) in units 120-1 to 120-M in order to spread the data out in time and/or space and thereby to increase the diversity of the signals.

The interleaved data are used to modulate frequency domain symbols in units 130-1 to 130-M, the output of which are modulated with the spreading codes w1-wM.

The M data streams are then added in adder 150 and broadcast on one or more antennas 155.

FIG. 1B illustrates graphically that the data for each user is spread over the entire spectrum available for the system, being separated from one another by the orthogonality of the spreading codes.

The plus sign in unit 140 of FIG. 1B indicates that the data for different users is combined and processed at the same time; data for an individual user is transmitted sequentially one chip period at a time.

The result, illustrated graphically on the right of FIG. 1B, is that the contents of a point in the Cartesian frequency-time graph will contain data for all users.

From a temporal viewpoint, the AP sends data to all users at the same time. From a spectral viewpoint, each user's spectral content occupies the entire physical bandwidth (inverse of a chip period) leaving the AP's transmitter. Thus, in DS-CDMA all users assigned a distinct spreading code occupy all frequencies at the exact time during the AP transmission. In existing DS-CDMA systems, the spreading occurs across time for a given carrier frequency.

An alternate prior art application of orthogonal spreading codes is placing the modulated chip sequence across sub-carriers in systems employing OFDM signaling (a.k.a. Multi-Carrier-CDMA (MC-CDMA)). Again, all assigned users exist simultaneously across the same physical frequencies and time epochs but in orthogonal signal spaces. Nevertheless, this prior art and variations of such also separates users using assigned orthogonal spreading codes.

Another prior approach is Orthogonal Frequency Division Multiple Access (OFDMA), illustrated in FIG. 2. This approach partitions sub-carriers of an OFDM signaling system into groups of adjacent (or possibly non-adjacent) sub-carriers where each mobile terminal is assigned a group (or groups) for the purpose of multiple-access. Thus, each user experiences frequency diversity only within its assigned groups and not the entire available frequency bandwidth (unless its group consists of the entire bandwidth).

FIG. 2 shows a set of modules similar to those of FIG. 1. User data enter on separate lines in the left of the Figure and are encoded in a set of modules 210-1,-210-M.

The encoded output is interleaved in modules 220-1-220-M. The interleaved output is used to modulate frequency-domain symbols in modules 230-1,-230-M.

The modulated frequency-domain data pass to a process unit 240 that performs an inverse Fourier transform. The multiple arrows between units 230-I and unit 240 indicate that a number of subchannels separated in frequency are jointly processed with an inverse Fourier transform, resulting in a composite time domain signal output from FT unit 240.

The time domain signal is optionally combined with a cyclic prefix for purposes of utilizing the circular convolution property of the Discrete Fourier Transform (DFT) pair (of which the Fast Fourier Transform (FFT) pair is a special case) to maintain sub-channel orthogonality in the presence of frequency-selective multipath propagation.

FIG. 2B illustrates graphically the process, in which the available spectrum is divided in frequency with an Nth user having data on one or more subchannels.

As with FIG. 1B, the transmitted signal at a given time contains data for multiple users. On the right side, the diagram differs from that of FIG. 1B indicating that each user has a separate portion of the spectrum.

SUMMARY OF THE INVENTION

The invention relates to a multiple-access communication systems downlink that uses OFDM and error-correcting codes for sending data to multiple Mobile Terminals (MT) users from a single Access Point (AP).

A feature of the invention is the AP aggregating packets of message information for multiple users and encoding them into a single multiple-access error-correction codeword.

The AP places the multiple-user codeword across frequency-domain sub-carriers and broadcasts from one or more spatially separated transmitter antennas to one or more mobile terminals.

During assigned time slots corresponding to specific OFDM symbols, each mobile terminal receives the channel corrupted OFDM symbols carrying the multiple-access codeword on one or more spatially separated antennas.

Each mobile terminal then decodes the entire multiple-access codeword and extracts the packets of information intended for that mobile terminal from the decoded multiple-access message word.

Effectively, information for multiple users (or a single user) is accumulated together and encoded using a near-capacity achieving channel coding system to construct a single codeword for use with iterative decoding architectures at the mobile terminals. Then, the multiple-access codeword containing the packets of information is modulated (optionally interleaved first) onto the frequency-domain symbols corresponding to the sub-carriers of an OFDM signalling scheme. Any non-negative integer multiple of multi-user codewords exactly spans either a single OFDM symbol or multiple OFDM symbols and is broadcast from one or more transmitter antennas to the multiple mobile terminals. By placing the multiple-access codeword across both diverse frequencies and diverse spatial antennas, each mobile terminal can exploit the full frequency diversity of the available physical bandwidth and the full spatial diversity (for the selected antenna configuration and usage). In addition, if the multiple-access codeword spans multiple OFDM symbols, then each user using this codeword also experiences the full available time diversity effects of the wireless channel between it and the AP terminal.

The physical hardware using this invention is split into two parts, with the first part at the transmitter in the AP equipment and the second part in each user terminal's receiver. Both the transmitter and receiver systems benefit from this invention and together implement this invention in their base-band circuits.

In the transmitter, there is the encoder for the error-correcting code, the interleaver (if needed), the sub-carrier symbol mapping (modulation and constellation power control), IDFT operation, and the insertion of the CP. Multiple-antenna configurations may vary, but this invention can easily be applied by those skilled in the art to MIMO signaling schemes and benefit from spatial diversity. Typically, these would be implemented using hardware components (e.g. ASIC, FPGA, etc.) but could be implemented with software.

In the receiver, there is the CP removal process, the DFT operation, sub-carrier de-mapping (equalizer, power adjustment, and demodulation of constellation points), the de-interleaver (again if an interleaver was used at the transmitter), and the decoder for the error-correcting system. In addition, the receiver would need to know the location in the data stream of its data. Although not limited to the following, the user would know the location of its data through a logical control channel between the AP and all mobile terminals or though header information located within the systematic bits of the codeword.

BRIEF DESCRIPTION OF THE DRAWINGS

FIGS. 1A and 1B: illustrate a prior art AP transmitter in a DS-CDMA wireless network system.

FIGS. 2A and 2B: illustrate another prior art Orthogonal Frequency Division Multiple Access (OFDMA).

DETAILED DESCRIPTION OF A PREFERRED EMBODIMENT

Figure 1A:
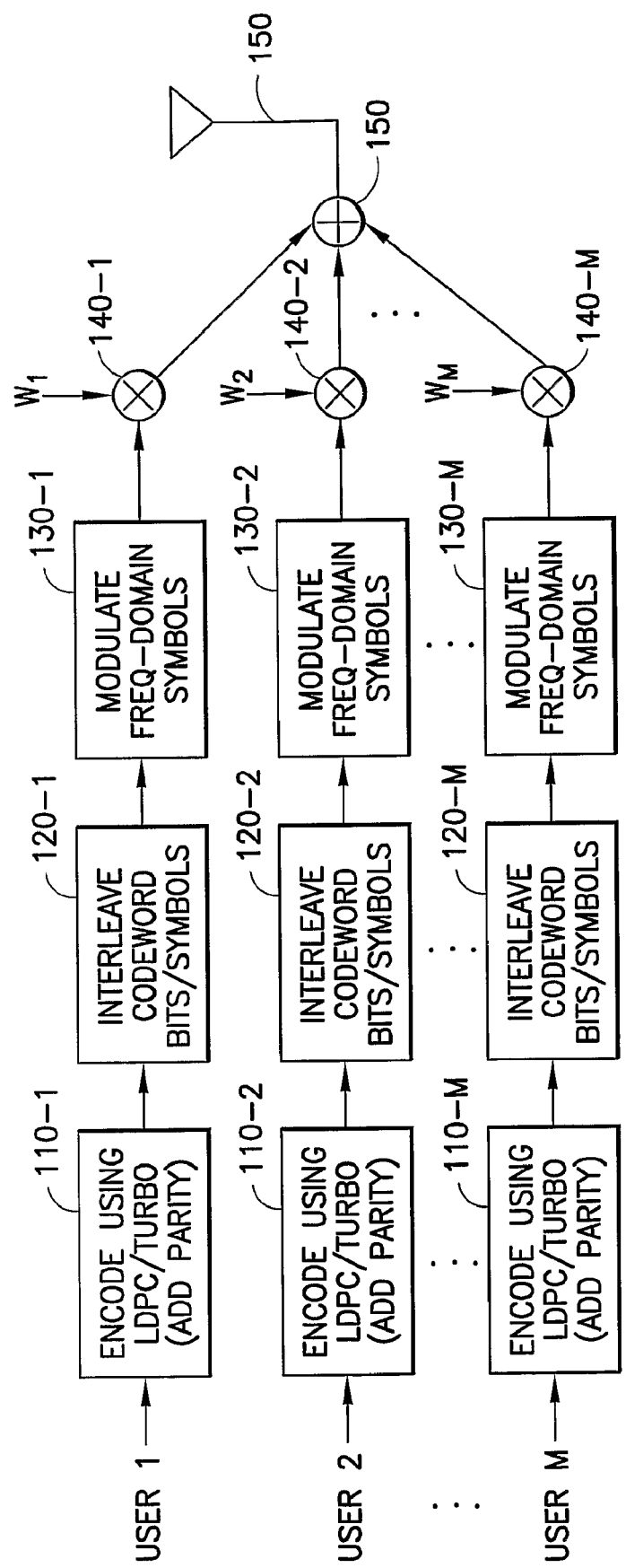

Recent developments in error correction coding (i.e. channel coding) have resulted in a family of asymptotically good codes using iterative decoding schemes based upon various message passing routines. These iterative decoding techniques include a step of passing extrinsic information about bit values that aid in detecting the actual bit values encoded and sent by a transmitter and observed at the channel's output by the receiver.

Various decoding algorithms are known along with varying degrees in performance and complexity, but these new discoveries in channel coding approach channel capacity (theoretically best with vanishing error probability) at the cost of longer codewords. Some examples (but not limited to these examples) of channel coding techniques employing iterative decoding architectures that nearly approach channel capacity are Parallel Concatenated Convolutional Codes (PCCC) (a.k.a. "Turbo Codes"), Parallel Concatenated Block Codes (PCBC), Low-Density Parity-Check (LDPC) Codes, Parallel Concatenated Zig-Zag (PCZZ) Codes, Repeat Accumulate (RA) Codes, and Irregular Repeat Accumulate (IRA) Codes, collectively referred to as "iterative decodable codes".

Because of the need of relatively long codeword lengths to gain improved error performance, current multiple-access schemes (e.g. CDMA and the OFDMA approaches, see FIG. 1 and FIG. 2) are not able to take advantage of these performance gains in error probability without suffering from relatively high data latencies.

This invention makes it possible for implementations utilizing long codewords for multiple user packet aggregation in wireless networks. Although any error correction coding system can be employed (e.g. convolutional codes) with packet aggregation, the newer message-passing error correcting codes (with asymptotically good distance properties) utilizing iterative decoding approach channel capacity as the codeword length increases, which is not the case with convolutional codes under similar complexity constraints.

This invention builds on the concept of packet aggregation and recent developments in error correcting codes for use in wireless network systems supporting multiple users employing multi-carrier signaling such as OFDM signaling.

Some advantages of the invention may be summarized as:

1. Because the multiple-access codeword is present across the entire physical frequency bandwidth and the transmit antennas, each mobile user experiences the full frequency and spatial diversity of its wireless channel and antenna configuration with the Access Point.
2. When employed in a time-division system (as described in the DL Super Frame Structure), different sets of multiple users may be aggregated together on different transport channels mapped to one or more OFDM symbols. Thus, effectively creating a Time-Division-Group-Access (TDGA) system where groups of users share a single transport channel.
3. Because the performance of these iterative decodable codes approaches capacity as the codeword grows in length, each user benefits from these near-capacity approaching codes using longer codeword structures.
4. For the same length codes, the invention offers better latency properties as compared to other multiple-access schemes.
5. From a queuing theory perspective, this invention allows for efficient adjustment of transport queues to suit channel conditions.
6. This invention is scalable in frequency, time, modulation, and antennas.

In embodiments of the invention that do not employ the time-division group access approach described below, the channel of the lowest channel capacity user limits the transmission rate for each transport channel to the smallest information channel capacity supported on that particular transport channel.

1. OFDM-PA is not available for the UL connection because each MT would not know the UL information of the other MTs within a coverage area of a AP prior to transmission. Thus the MT of interest could not aggregate packets from other MTs.
2. We introduce a multiple-access scheme that can take advantage of these new channel-coding developments without the high data latencies that the prior art suffers from for codewords of identical length. We also introduce a practical DL Super Frame Structure complementing and extending the new multiple-access approach (termed OFDM-PA) that has benefits on both the system level (network) and the component level (AP and MTs).

Figure 3:
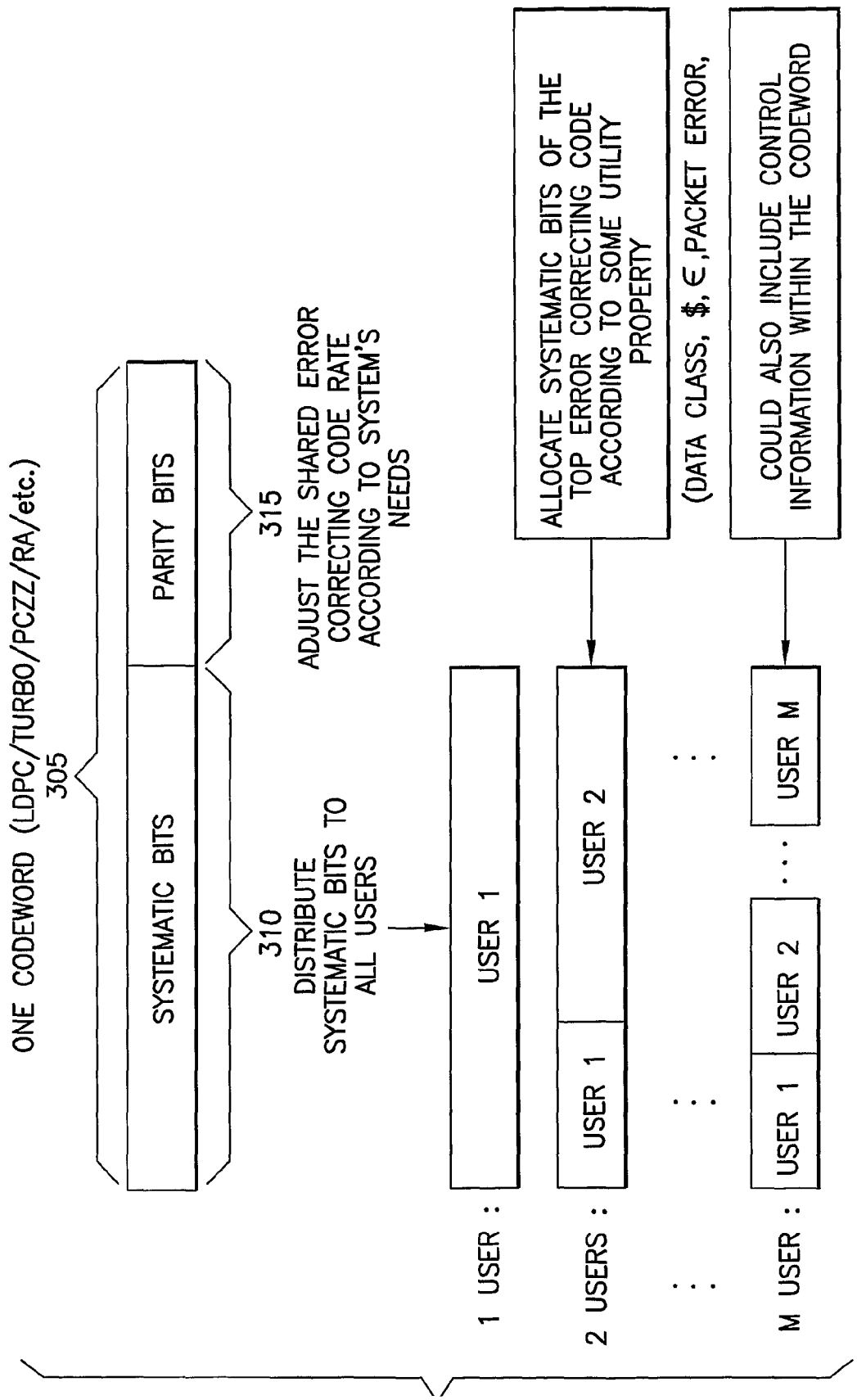
FIG. 3: shows an example of Packet Aggregation using capacity achieving codes.

FIG. 3 illustrates the packet aggregation concept where $M \in \{1, 2, \ldots\}$ different users share the systematic portion of a single codeword from a near-capacity achieving iterative decodable error correction code considered asymptotically good (e.g. LDPC, PCCC, etc.).

First, packets of information for the M users and control information (optional) are aggregated and placed into a single multi-user message word denoted with bracket 305, $$m_{PA} = [m_0, m_1, m_2, \ldots, m_M]$$

where $m_0$ is additional control information (optional) and $m_i$ is the message word component intended for the $i^{th}$ user (i.e. $i^{th}$ MT) where each $m_i$ can be of a different length. Bracket 310 indicates the data for the several users and bracket 315 indicates parity bits (that control a shared error correcting code rate) that may be adjusted according to the system's needs. The AP can design these lengths of the $m_i$ along with the overall aggregated length of $m_{PA}$ (including the ECC code rate) according to some performance criteria suitable to the constraints placed on the AP. This multi-user message word, $m_{PA}$, is then encoded using an asymptotically good ECC encoder, $E_{ECC}(\bullet)$, (e.g. LDPC, PCCC, etc.) that also includes any necessary interleaving and modulation into a multi-user codeword, $$c_{PA} = E_{ECC}(m_{PA}),$$

and broadcasted to all M users through their own physical channel function, $F_{Channel}^{(i)}(\bullet)$ for $i=1, 2, \ldots, M$, where each MT receiver observes the output of their channel given the multi-user codeword as its input, $$r_{PA}^{(i)} = F_{Channel}^{(i)}(c_{PA}) \text{ for } i=1, 2, \ldots, M.$$

Each of the M users decodes their received version of the channel-corrupted codeword, $r_{PA}^{(i)} \rightarrow \hat{m}_{PA}^{(i)}$, given information about the channel function, $F_{Channel}^{(i)}(\bullet)$ (which contains random elements (e.g. additive noise)) using the appropriate ECC decoder, $D_{ECC}(\bullet|\bullet)$, which includes any necessary de-interleaving and de-modulation.

$$\hat{m}_{PA}^{(i)} = D_{ECC}(r_{PA}^{(i)} | F_{Channel}^{(i)})$$

Here we assume perfect channel state information, but in practice an estimate of the channel function would be used, $\hat{F}_{Channel}^{(i)}(\bullet)$, by the receiver. Thus, for the $i^{th}$ user, the received multi-user message word is composed of its estimates for all the messages for the M users contained in the packet aggregate message word sent by the transmitter.

$$\hat{m}_{PA}^{(i)} = [\hat{m}_0^{(i)}, \hat{m}_1^{(i)}, \hat{m}_2^{(i)}, \ldots, \hat{m}_M^{(i)}]$$

Each user then extracts and uses its estimates for the control message $\hat{m}_0^{(i)}$ and information message $\hat{m}_i^{(i)}$ intended for that user, i.e.

$$\hat{m}_{PA}^{(i)} \rightarrow [\hat{m}_0^{(i)}, \hat{m}_i^{(i)}] \text{ for } i=1, 2, \ldots, M.$$

On the lower left of FIG. 3, lines for one user, two users etc indicate possible allocations of the systematic bits. They may be allocated according to a number of schemes, such as a data class, financial, the probability of packet error, etc.

As an option, control information may be included within the codeword.

Figure 4A:
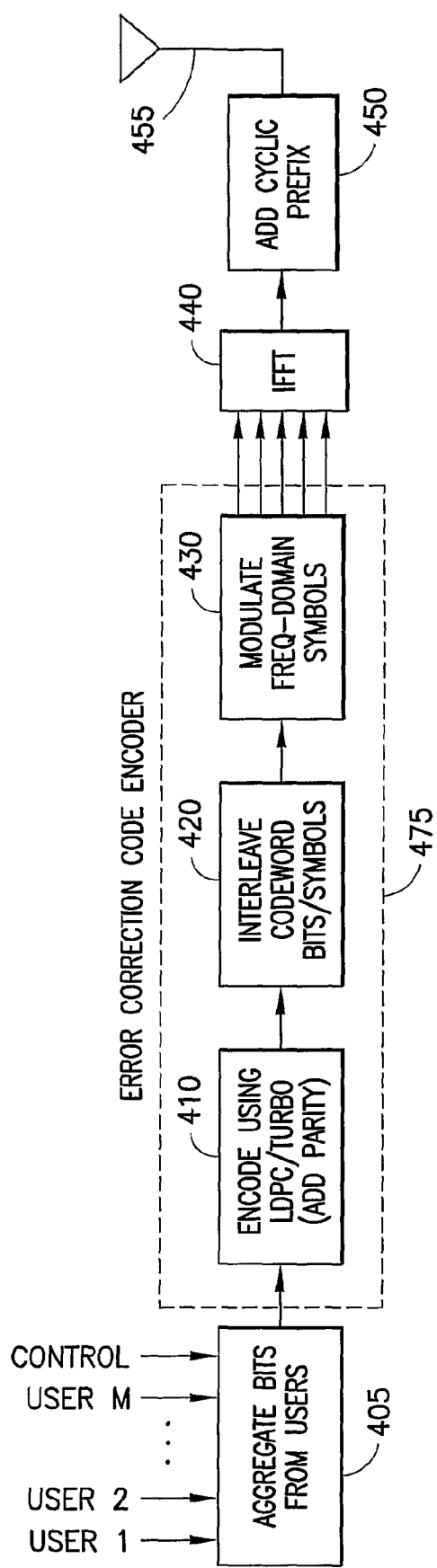
FIGS. 4A and 4B: illustrate an Access Point (AP) OFDM-PA transmitter according to the invention.

FIG. 4A illustrates an example of a single antenna AP transmitter employing OFDM-PA for DL operation and using either a LDPC or Turbo encoder followed by an interleaver. Note that depending on the ECC an interleaver may not be needed, and although a single antenna 455 is depicted in the Figure, the antenna symbol represents schematically one or more antennas. The invention easily scales to multiple transmit antennas by those experienced in the art.

First, in processor 405, the AP aggregates messages intended for one or more MT into a single "multi-user message word," $m_{PA}$, consisting of the concatenation of multiple smaller messages, $m_i$ for $i=0, 1, 2, \ldots, M$, consisting of information data and/or control data. Then the AP encodes in unit 410 each multi-user message word using a LDPC code (or other message-passing code) into a single codeword, $$c_{PA} = E_{ECC}(m_{PA}),$$

of a particular code rate and particular length designed for the desired application (i.e. one OFDM symbol for applications with low latency requirements (see FIG. 7) or multiple OFDM symbols for applications that can tolerate high data latency (see FIG. 8)). The AP may vary the code rate and number of MTs operating within any particular multi-user codeword according to channel conditions or maintain fixed parameters. Likewise, the AP allots the amount of systematic bits within the multi-user message word each MT receives and may vary each portion according to some criteria of its choosing (see FIG. 3).

For each multi-user codeword, the AP then maps the codeword elements (e.g. bits) onto modulated symbols in unit 430, placed across the sub-carriers of one or more OFDM symbols. This mapping/modulation process may take into account the use of multiple antennas in the frequency-domain or time-domain. Given the number of bits per OFDM symbol per transmitter antenna, the design of the ECC's codeword length and code rate will be adjusted to accommodate the multi-user message word size.

Figure 2A:
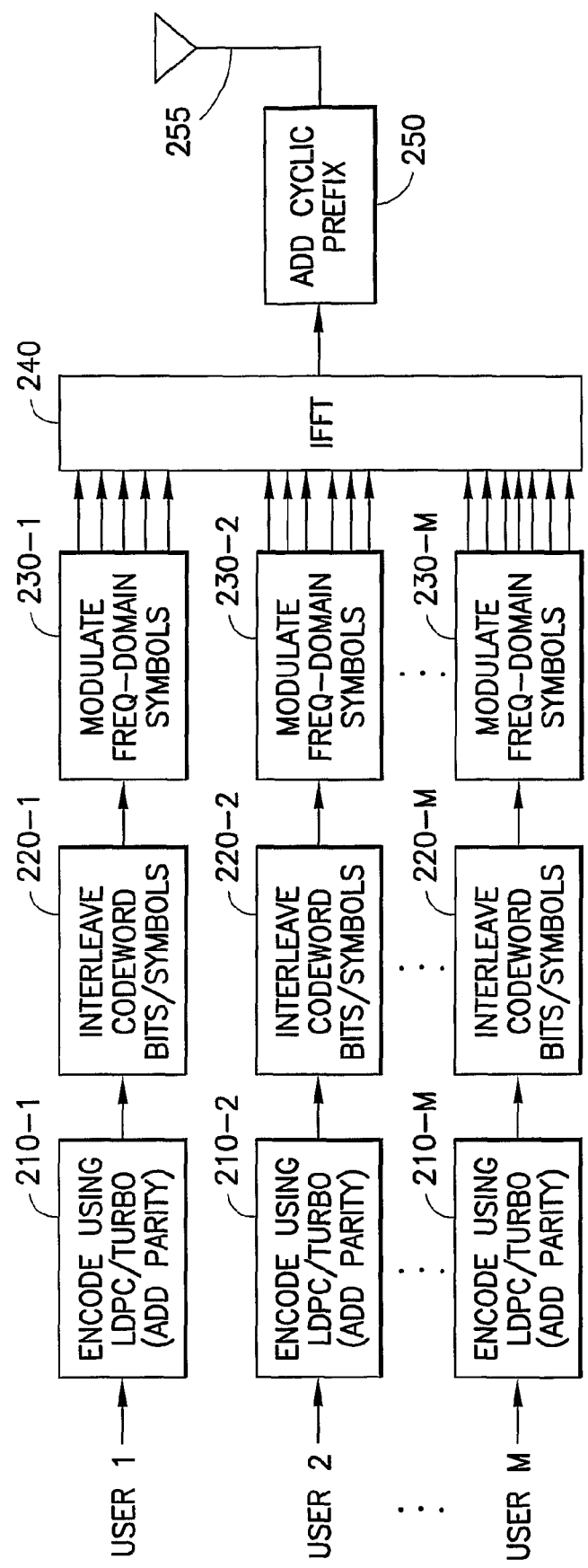

The box labelled "Error Correction Code Encoder" 475 including encoder unit 410, optional interleaver unit 420 and modulator unit 430 perform the same functions as their counterparts in FIGS. 1 and 2, but on the concatenated message word from unit 405.

Figure 4B:
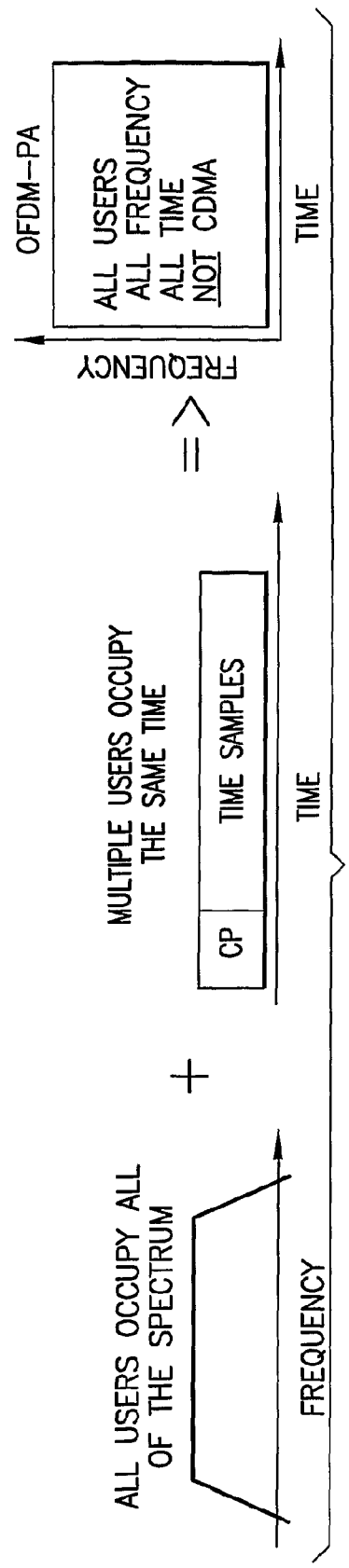

FIG. 4B corresponds to FIGS. 1B and 2B, indicating that data for all users is spread across the entire available spectrum as a result of the Fourier transformation, but that the users are not separated by frequency channels as in OFDM and that the users are not separated by spreading codes, as in CDMA.

For each OFDM symbol, the AP transmitter uses the IFFT 440 to convert the frequency-domain OFDM sub-carrier symbols into time-domain symbols and then appends the corresponding CP samples in unit 450. Then, the AP broadcasts the OFDM symbols to all MT within the AP's range. Between the AP transmitter and each MT receiver, there exists a wireless channel, $F_{Channel}^{(i)}(\bullet)$ for i=1, 2, ..., M, assumed different from one MT to another (although not required to be different).

FIG. 4B is a counterpart to FIG. 2B, showing that a broad frequency range is used to hold the RF, instead of a set of narrow channels. On the right of FIG. 4B, the box in the frequency-time plane indicates graphically that data for all the users share the frequency range and are present at the same time, but the method is not CDMA, since the data are not separated in the receiver by the use of different spreading codes, but by de-aggregating (reversing the aggregation step) the packets.

Figure 5:
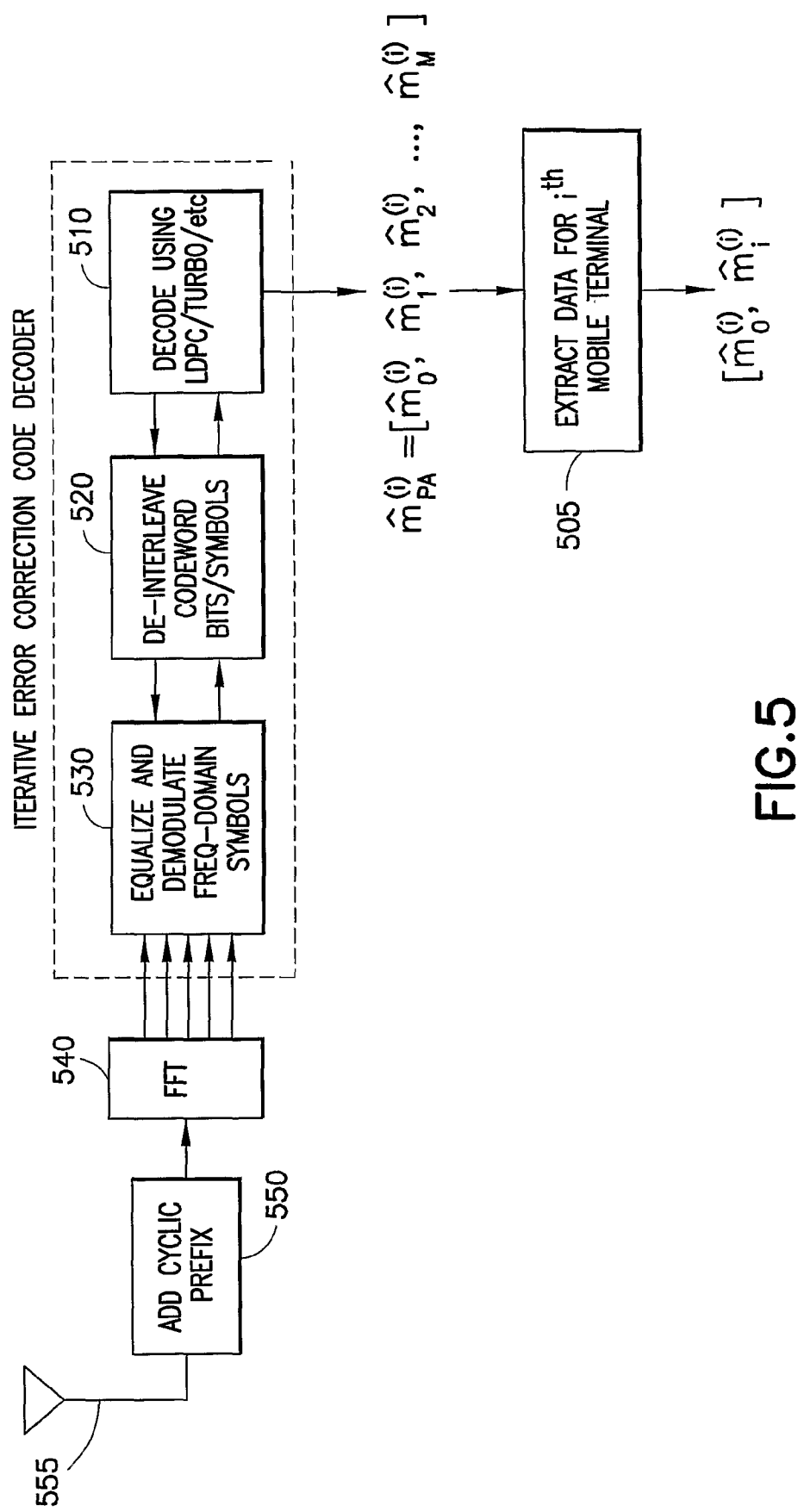
FIG. 5: illustrates a Mobile Terminal (MT) OFDM-PA receiver.

FIG. 5 illustrates an example of a receiver structure implementing OFDM-PA during DL operation at each MT (e.g. mobile phone, computer, gaming device, etc.) used for detecting its information from the received codeword.

First, each MT receives the channel corrupted OFDM symbol(s) corrupted by the channel between it and the AP containing the multi-user codeword using one or more receive antennas 555 spatially separated. For each receive antenna, the MT removes the CP samples from each OFDM symbol in unit 550 and converts the time-domain symbols into frequency-domain symbols using an N-point FFT 540 corresponding to the number of sub-carriers in the OFDM modem. Note that equalization in unit 530 can be done either in the time-domain or in the frequency-domain, but without loss of generality, this system concept may assume perfect Channel State Information (CSI) at the receiver.

Optional de-interleaver 520 performs the inverse function of the interleaver in FIG. 4.

Then, each MT demodulates/detects the frequency-domain symbols corresponding to the multi-user codeword and iteratively decodes in unit 510 the codeword, extracting an estimate of the sent multi-user message word, $$\hat{m}_{PA}^{(i)} = D_{ECC}(r_{PA}^{(i)} | F_{Channel}^{(i)}).$$

There are two modes of operation in which the demodulator/detector and the ECC decoder may operate for the accurate detection of the transmitted multi-user message word. The first mode of operation is where the demodulator/detector and ECC pass extrinsic information between the two modules (e.g. through a de-interleaver as indicated in FIG. 5) during iteration. The second mode of operation is where the demodulator/detector only sends likelihood information to the ECC decoder in a single-pass (e.g. also through a de-interleaver) without iterating between the two modules. Thus in this single-pass mode, the only iteration is done within the ECC decoder after receiving likelihood information from the demodulator/detector.

Then using control information located with a header or another communication transport channel, each MT extracts the estimated message intended for that particular user and discards the remaining message components intended for the other users communicating with the AP.

$$\hat{m}_{PA}^{(i)} \rightarrow [\hat{m}_0^{(i)}, \hat{m}_i^{(i)}] \text{ for } i=1, 2, \ldots, M$$

An important feature of OFDM-PA is that it allows MTs operating in multiple-access wireless networks to benefit from the developments in iterative channel coding/decoding techniques for multiple users without the relatively long latency requirements due to long codeword lengths. From a queuing theory perspective, OFDM-PA allows the efficient adjustment of transport queues (service time, block sizes) to suit channel conditions and MT demands. OFDM-PA is scalable in frequency, time, modulation order and spatially separated antennas, but OFDM-PA is not available for the UL connection. In fact, the multi-user codeword concept can also be used with MC-CDMA by spreading the codeword elements by all available spreading codes at the AP transmitter and each MT using all the spreading codes for demodulations/de-spreading/detecting purposes. It is important to note this alternative usage of OFDM-PA over all the spreading codes in a MC-CDMA system does not use the spreading codes for multiple-access purposes like existing standard approaches (i.e. IS-95, WCDMA).

Each MT can utilize the full frequency diversity available in the channel between the AP and itself. Full frequency diversity removes the drawback present in OFDMA of MT's assigned sub-carriers in a spectral null. Although MC-CDMA offers some frequency diversity, unless the spreading factor corresponds to the use of the FFT order (which has its own drawbacks), MC-CDMA cannot provide full frequency diversity. In addition to frequency diversity, each MT can also utilize the full spatial diversity available in the channels between AP and MT antenna pairs because the multi-user codeword elements stretch across both sub-carriers and transmit antennas. If a multi-user codeword spans more than one OFDM symbol and each OFDM symbol experiences a slightly different channel for a particular AP to MT channel, then that MT may also benefit from some time diversity, but the benefit from this phenomenon is limited when compared to the advantages of frequency and spatial diversity. Using the same time duration (an OFDM epoch), the entire frequency spectrum is used for all operating MTs without the use of a spreading code as in CDMA systems.

Another property of OFDM-PA is that all MTs share parity information in the multi-user codeword. Thus, all MTs with data information within a particular multi-user codeword must operate using the same code rate, modulation scheme and antenna configuration. Thus, each MT must process the entire codeword to retrieve its portion of the data. In the time-division DL system proposed below, this in effect moves power consumption from analog components such as RF/ADC circuitry to low-power digital circuitry such as CMOS technology. Depending on the relative overall power consumption this trade-off produces, this can produce an advantage for OFDM-PA from a MT power viewpoint.

In practice, a small fraction of sub-carriers will be used to bear pilot signaling to be used for additional parameter estimation purpose.

Downlink Physical Layer Frame Format

In this section, we describe a DL Super Frame Structure (see FIG. 6) that exploits the properties of OFDM-PA in the DL of a multiple-access wireless network consisting of an AP communicating to one or more MTs. The AP sends control and information data through this DL Super Frame Structure on a periodic basis. We also discuss implications for the AP, MTs and network applications using this proposed time-division OFDM-PA system.

Figure 6:
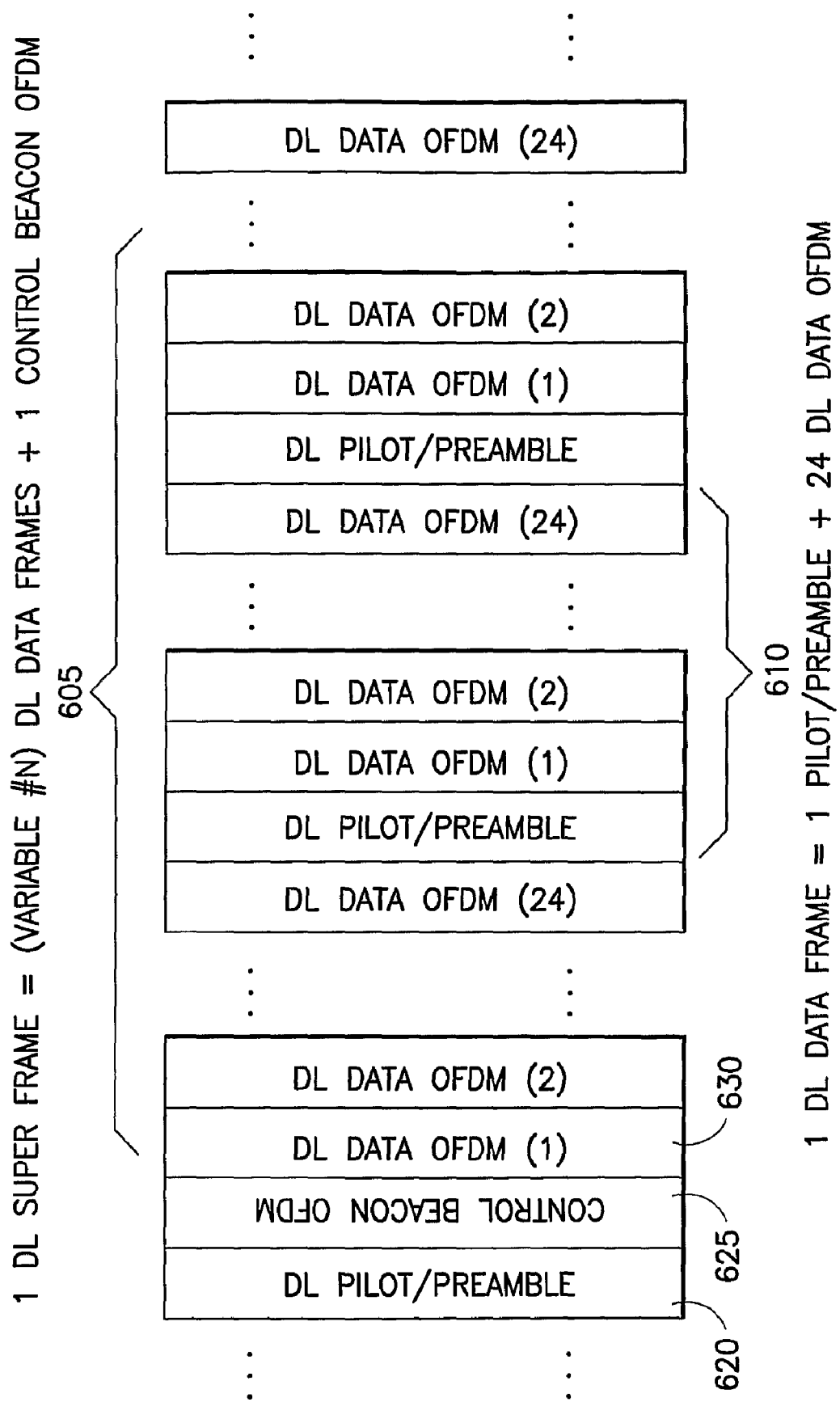
FIG. 6: illustrates a DL Super Frame Structure.

FIG. 6 illustrates a proposed DL Super Frame Structure, in which there are three types of signaling:

Pilot/Preamble Signaling (620) used for channel and parameter estimation by MTs. It consists of deterministic signaling waveforms occupying one or more consecutive OFDM symbol time epochs known by all the MTs operating with the AP.

Control Beacon OFDM Signaling (625) sent by the AP to all MTs operating under the AP's control. The control beacon signaling consists of one or more consecutive OFDM symbols sent from one or more transmit antennas containing information sent by the AP intending to control the system's current and/or future state of operation (e.g. group assignments, system time, AP identifier, paging information, transport channel mode of operation, etc.).

DL Data OFDM Signaling (630) consists of one or more OFDM symbols sent from one or more transmit antennas bearing information data encoded and modulated intended for use by MTs. A transport channel is then a collection of OFDM symbols existing on either consecutive or non-consecutive OFDM symbol time epochs. Within a DL Super Frame Structure, there exists a collection of one or more transport channels operating in some function mode (e.g. OFDM-PA, OFDMA, MC-CDMA, single-user OFDM, etc.).

FIG. 6 is a visual representation of a proposed DL Super Frame Structure that combines OFDM-PA and time-division multiplexing for the purpose of multiple-access. The example provided uses 24 transport channels mapped to 24 indexed DL Data OFDM Signaling entities.

At the beginning of each DL Super Frame Structure, the AP broadcasts pilot/preamble signaling (620) to be used by MT receivers for estimation and synchronization purposes just before receiving control signaling in the following control beacon entity.

Then, the AP transmits the control beacon signaling (625) conveying control information describing the multi-access operation and system configuration. This control beacon is broadcast by the AP to all MT within its range (or in a targeted region such as a cell sector) in a common signaling format consisting of an error correction code and modulation approach that all intended MTs can decode. One purpose of the control beacon is for the AP to communicate the transport channel assignments to all MTs operating with the multi-access system. The control beacon can bear many different system parameters in addition to the current and/or future state information of the multiple-access system.

Also in each DL Super Frame Structure, there are one or more consecutive DL Data Frames 610 (see FIG. 6) where each DL Data Frame consists of one or more data bearing DL Data OFDM signaling entities with additional pilot/preamble signaling if needed (the pilot/preamble signaling may be omitted if permitted by environmental operating conditions) follow after the control beacon signaling.

Time Division Group Access (TDGA) of Transport Channels (OFDM Symbols)

Because OFDM-PA limits the data rate of multi-user codewords sent to the MT to the lowest achievable rate within the codeword, DL Super Frame Structures according to the invention allow for the time-division of multi-user codewords over individual transport channel uses. All MTs within a multiple-user codeword must use the same coding and modulation scheme transmitted from a certain number of transmit antennas. Thus, the MT supporting the lowest data rate due to channel constraints limits the data rate for all MTs grouped with it in the multi-user codeword.

One can map transport channels of a DL Super Frame Structure to specific indexed OFDM symbols, thus creating a time-division system where multiple MTs can be grouped according to some criteria (data rate, modulation scheme, channel coding, low latency tolerant data, high latency tolerant data, single antenna, multiple antenna, etc.). Thus, the OFDM-PA multiple-access approach allows for the grouping of MT data by the antenna configuration, data rate, modulation, coding rate, high Doppler channels, low Doppler channels, etc. By grouping users of similar channel conditions, this also allows the use of different ECC coding for each multi-user code to accommodate the channel conditions. This is another important property of this time-division OFDM-PA system. Because of the time-division of transport channels consisting of one or more OFDM symbols, OFDM-PA can coexist with other modes of operation (e.g. dedicated transport channel where adaptive modulation is employed).

As an example of an application of the foregoing, user V is receiving a video download that requires a large amount of data and has a large capacity receiving system. The hardware in MT V can handle four OFDM symbols in each block 610—e.g. 1, 6, 12 and 18. User I is on the Internet and needs (or is willing to pay for) only one OFDM symbol per block 610. User T is engaged in a plain old telephone call and needs only a fraction of one OFDM symbol per block 605. The AP will send out in the control beacon signaling appropriate data indicating to each MT when its data will arrive.

The sequence of assembling control data and user data for the arrangement of FIG. 6 may be:

Establish the frame of a Super Frame with N Data Frames of M time slots plus a preamble of control data, and a set of OFDM symbols to fill the time slots. The control data will vary for different systems, but will specify to each MT when its data will be transmitted and any additional required information needed to decode the data.

The control data do not have to be retransmitted along with every codeword. In one alternative version of the invention, the control data could be transmitted initially and then retransmitted only when there was a change; i.e. addition of a new user, removal of an old user or change in the space allocated to a user. Thus, a set of users (MTs) receives data from an AP in a set of transmissions of multi-user codewords (which may have the structure of FIG. 6 or in another structure).

Control data or a control component such as 315 in FIG. 3 may be within codeword structure 305 or located elsewhere. In particular, the control component does not have to be located within a sub-block 610 in FIG. 6, but may be located elsewhere within the block 605 or in another block 605 separated in time.

Thus, there will be a set of codewords having N members and at least one control component that specifies the connection between users and subsets of bits. The control component may, but need not, be repeated in every block 305 or it may be present only when there is a change in the allocation of data bits to users. In a rapidly changing environment, the control word might be present in every data structure 605 and in a slowly changing environment, many thousands of data structures might pass without a control component because the allocation of bits to users does not change.

The same sequence for the previous example is followed, in which the AP concatenates a set of data packets for each time slot into a message word, codes the message word with an error correcting code to form a multi-user codeword (the number of users may be only one), and modulates the frequency domain symbol with the codeword, repeating this sequence to assemble the Data Frame 610;

The modulated symbols are Fourier transformed and a cyclic prefix is appended. Then, for each data frame, the AP transmits the Data Frame preamble and the previously specified number of OFDM symbols (24 in this example).

Mobile Terminal Power Consumption Considerations

In this time-division system where boundaries occur between OFDM symbol epochs, one can group MT supporting similar rates together on common multi-user codewords that directly map to the OFDM symbols representing transport channels. By so doing, each MT has the option to turn off its RF and ADC components during OFDM symbols that do not bear information intended for it (termed "micro-sleep") and thus conserve battery life (if battery operated). Alternatively, the MT may elect to reduce its power consumption by only turning on its RF and ADC components during OFDM symbols with information useful for its operation (termed "micro-wake") such as the pilot/preamble signaling and control beacon signaling. Thus, in idle mode, the MT would have a very small duty-cycle by only turning on RF/ADC circuitry during the control beacon signaling and the preceding pilot/preamble signaling that occur once per DL Super Frame Structure. When not in idle mode (actively receiving data from AP), the MT power consumption using this "micro-sleep/micro-wake" mode of operation would be proportional to the amount of data it receives over multiple OFDM symbols.

Access Point Operational Considerations

Within this time-division frame structure, the OFDM-PA concept allows the AP to scale its power consumption in that case with the number of MTs operating within its range. Similar to the "micro-sleep" operation at the MTs, the AP can shut down RF/DAC operations during OFDM symbols that bear no data. If done intelligently, the AP's power consumption will be proportional to the aggregate data transfer. The AP can also group users and adjust code rates per OFDM-PA group to optimise system parameters such as system throughput or system power consumption. In addition, a collection of AP's operating in multiple cellular regions may communicate and adjust micro-wake times to reduce overall adjacent cell interference.

Figure 7:
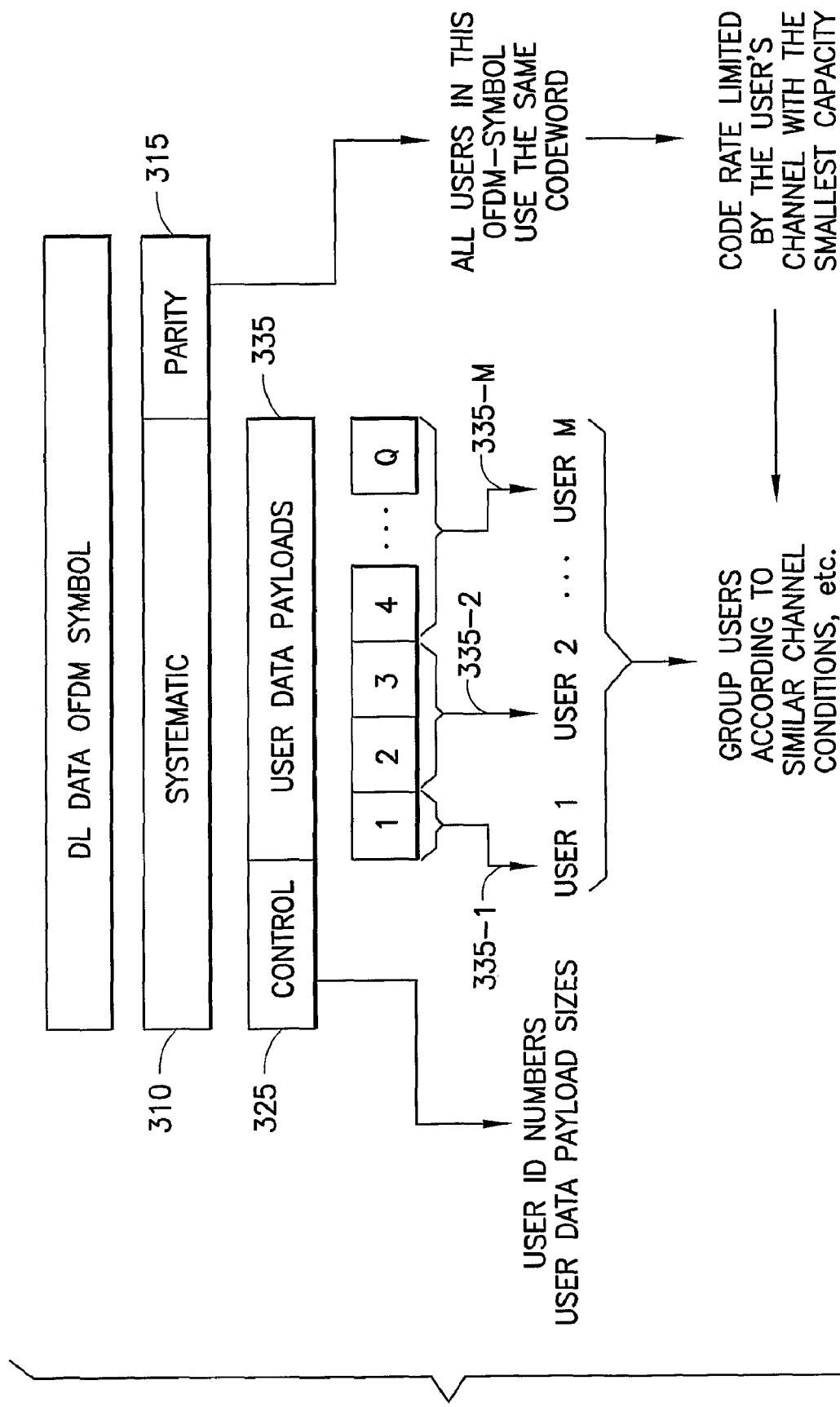
FIG. 7: illustrates a Multi-user Codeword Spanning a Single DL Data OFDM Symbol.

FIG. 7 illustrates an application of the invention, in which a single codeword spans a single DL Data OFDM symbol (block 630 in FIG. 6). In this case, since according to the OFDM-PA structure, all users of this OFDM symbol use the same codeword and are therefore required to use the same code rate (that of the user with the smallest channel capacity), it is preferable to group users together that have similar circumstances and therefore will have similar code rates.

FIG. 7 is similar to FIG. 3, in that the second block has a systematic portion 310 and a parity portion 315. The third line indicates a control portion 325 that indicates to the receivers the ID numbers of the users for this codeword and the size of the data payload for each user. Block 335 indicates generally the user data payloads. Below that line, block 335-1 denotes the data for user 1, block 335-2 denotes the data for user 3 and block 335-M denotes the data for user M. There are Q blocks indicated, since a user may have more than one block.

Figure 8:
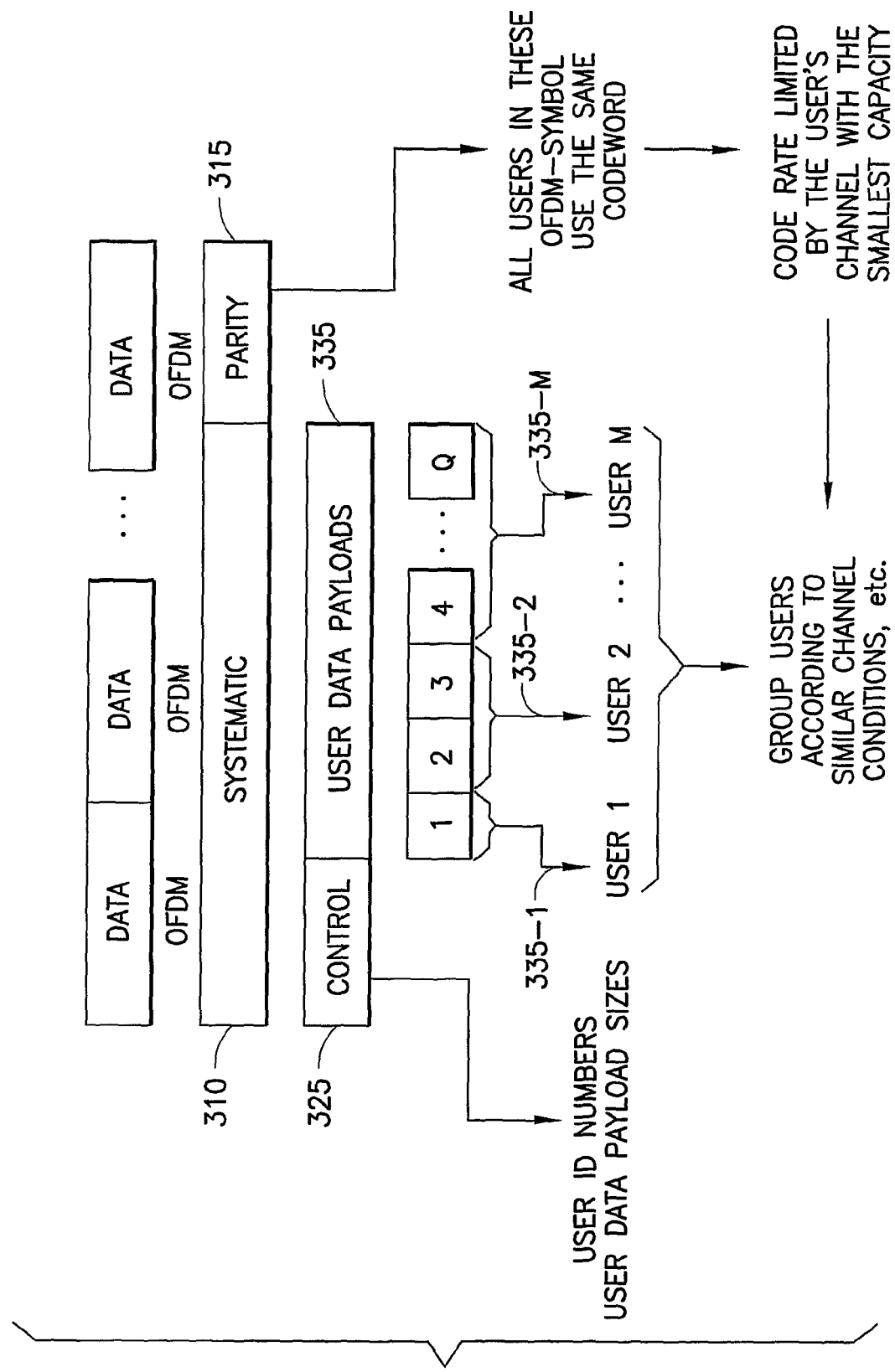
FIG. 8: illustrates a Multi-user Codeword Spanning Multiple DL Data OFDM Symbol.

FIG. 8 is similar to FIG. 7, indicating the blocks for a longer codeword that spans several OFDM symbols. The top line indicates several blocks that represent data in codewords. There also, the second block has a systematic portion 310 and a parity portion 315. The third line indicates a control portion 325 that indicates to the receivers the ID numbers of the users for this codeword and the size of the data payload for each user. Block 335 indicates generally the user data payloads. Below that line, block 335-1 denotes the data for user 1, block 335-2 denotes the data for user 3 and block 335-M denotes the data for user M. There are Q blocks indicated, since a user may have more than one block.

Relative to the OFDMA approach where each MT can have its own modulation and coding configured with the AP, OFDM-PA also helps reduce the different number of modulation and coding schemes active at the AP during multiple-access operation. By grouping MT by geographical locations, the AP can easily employ cell sectoring to improve frequency reuse. In addition, OFDM-PA can coexists with other modes of operations in this time-division approach such as a single MT operating in a dedicated transport channel using an adaptive modulation link with the AP.

Network and Applications Considerations

From a network point of view, this time-division frame structure employing OFDM-PA can accommodate various data services requiring different latency requirements and data throughput behaviours found in CBR, VBR and ABR services (although not limited to these services). By compressing the number of OFDM time epochs in one codeword use, the network can respond faster to network conditions than the prior art approaches where codewords occupy longer time durations. By adjusting the number of OFDM symbols each multi-user codeword resides on, the network can support services with either high or low data latency requirements. Furthermore, OFDM-PA allows for flexible datagram sizes within each multi-user codeword to accommodate different adjustable queuing approaches and criteria.

Because of recent developments in error correction coding using iterative message-passing structures, it becomes possible to introduce an effective multiple-access system using a time-division OFDM-PA approach that can fully exploit the benefits of these codes without severe data latency penalties as with OFDMA and MC-CDMA using these same codes. These iterative decoded codes approach Shannon's information theoretic channel capacity as their codeword lengths grow to infinity. OFDM-PA takes advantage of this property and in time-division systems (as the one proposed above) allows for AP and MT designs that are both data service conscious and power conservative.

Additional benefits of OFDM-PA include full frequency, spatial and time diversity to all MT units as provided by their respective wireless channels with the AP. This is unlike OFDMA that does not provide full frequency diversity for each MT where the diversity is limited to the actual subcarriers the MT has been assigned to use by the AP. In an OFDM-PA system, the MT can also adjust the on/off periods ("micro-wake/micro-sleep") of the RF/ADC circuitry according to their data locations in the DL Data Frame. During idle modes of operations (i.e. no active data communications), the MT can shut down its RF/ADC circuitry with the exception during the DL Control Beacon signaling and the pilot/preamble preceding the beacon.

Furthermore OFDM-PA is easily scalable with respect to the number of antennas, sub-carriers, bandwidth, and the number of users. While comparing to other approaches, OFDMA becomes more difficult with increasing number of users in a limited bandwidth because system resource allocation becomes even more difficult to assign for newly active MTs with OFDMA, the AP must determine sub-carrier allocation for each MT. Similarly, the number of spreading codes limits the number of users in a CDMA system and may block out new MTs due to a lack of available spreading codes.

In OFDM-PA, all users within a multi-user codeword must use the same modulation and coding scheme. This requirement is relaxed for OFDMA where each MT has dedicated frequency allotment and may configure its own modulation and coding scheme with the AP, which may lead to complex AP designs accommodating larger numbers of MTs. For the same codeword length, OFDMA and the CDMA approaches would require longer periods to acquire the codeword resulting in more power consumption and higher data latency that that of OFDM-PA.

Those skilled in the art will appreciate in the light of the above disclosure that the functional blocks shown in the Figures may be implemented in special or general-purpose electronic circuits adapted by programs or special-purpose wiring to perform the functions described herein.

Although the invention has been described with respect to a limited number of embodiments, those skilled in the art will appreciate that other embodiments may be constructed within the spirit and scope of the following claims.

I claim:

1. A method, comprising:
   receiving input data for M users and dividing said input data into a set of packets;
   concatenating said packets into a set of combined message words containing packets for each of said M users, where M is an integer of at least two;
   encoding said combined message words with an error-correcting code to form a multi-user codeword;
   modulating a set of frequency-domain symbols with said multi-user codeword, thereby forming a modulated set of frequency-domain symbols adapted to be transmitted by at least one transmit antenna;
   transforming a modulated set of frequency-domain symbols for each transmit antenna with an inverse fourier transform to form a set of time-domain symbols;
   appending a cyclic prefix to each member of said set of time-domain symbols for each transmit antenna; and
   transmitting said cyclic prefix and said time-domain symbols from said at least one transmit antenna in a multi-user transmitted signal.

2. A method according to claim 1, further comprising:
   receiving in a receiver, having at least one receive antenna, of an individual user of said M users, said multi-user transmitted signal;
   removing said cyclic prefix;
   performing a fourier transform to form a set of received frequency-domain symbols for each receive antenna of said individual user;
   demodulating said received frequency domain symbols for each receive antenna of said individual user;
   decoding said frequency-domain symbols with said error-correcting code; and
   separating a set of packets directed at said individual user.

3. A method according to claim 2, in which said step of decoding is performed iteratively.

4. A method according to claim 1, in which said set of frequency-domain symbols span a set of orthogonal frequency division multiplex subcarriers within a transmission frequency range, whereby said packets of said M users have frequency diversity of said transmission frequency range and spatial diversity of said at least one transmit antenna.

5. A method according to claim 4, in which said packets of said M users are interleaved before said step of modulating, whereby data from each of said M users is spread in frequency and across said at least one transmit antenna.

6. A method according to claim 4, further comprising forming a set of combined message words containing a set of message word components for each of said M users and at least one control component located in at least one member of said set of combined message words, said control component being dependent on a distribution of said message word components within said set of message words.

7. A method according to claim 6, in which at least two of said set of message word components have different lengths.

8. A method according to claim 1, in which said packets of said M users are interleaved before said step of modulating, whereby data from each of said M users is spread in frequency, spread in time, and across said at least one transmit antenna.

9. A method according to claim 1, further comprising forming a combined message word containing a set of message word components for each of said M users and at least one control component, said control component being dependent on said message word components.

10. A method according to claim 9, in which at least two of said set of message word components have different lengths.

11. A method, comprising:
    establishing a time division group access super frame of N data frames of M time slots, comprising at least one preamble containing control data specifying which time slots will contain data for each mobile terminal and a set of orthogonal frequency division multiplex symbols assigned to a corresponding set of time slots;
    transmitting said preamble for each super frame of the N data frames;
    receiving input data from a user set of K users and dividing said input data into a set of data packets, where K, M, and N are integers of at least two;
    for each time slot:
    grouping said data packets in subgroups for said each time slot according to said preamble;
    concatenating data packets in a subgroup into a combined message word containing data packets for each user in a subgroup;
    encoding said combined message word with an error-correcting code to form a multi-user codeword;
    modulating a set of frequency-domain symbols with said multi-user codeword;
    transforming modulated frequency-domain symbols with an inverse fourier transform to form a set of time-domain symbols;
    appending a cyclic prefix to said set of time-domain symbols; and
    transmitting said cyclic prefix and said time-domain symbols in a multi-user transmitted signal.

12. A method according to claim 11, in which at least one mobile terminal receives data in two or more of said time slots in a super frame.

13. A method according to claim 12, in which said step of decoding is performed iteratively.

14. A method according to claim 11, in which at least one mobile terminal operates in a micro-wake mode.

15. A method according to claim 14, in which said packets of said K users are interleaved before said step of modulating, whereby data from each of said K users is spread in frequency.

16. A method according to claim 14, further comprising forming a combined message word containing a set of message word components for each of said K users and at least one control component, said control component being dependent on said message word components.

17. A method according to claim 11, further comprising:
receiving in at least one antenna of a receiver of an Nth individual user said multi-user transmitted signal;
removing said cyclic prefix;
performing a Fourier transform to form a set of received frequency-domain symbols;
demodulating said received frequency domain symbols;
decoding said frequency-domain symbols with said error-correcting code; and
separating set of packets directed at said individual user.

18. A method according to claim 11, in which said set of frequency-domain symbols span a set of orthogonal frequency division multiplex subcarriers within a transmission frequency range, whereby said packets of said K users have frequency diversity of said transmission frequency range.

19. A method according to claim 11, in which said packets of said K users are interleaved before said step of modulating, whereby data from each of said mobile terminals is spread in frequency.

20. A method according to claim 11, further comprising forming a combined message word containing a set of message word components for each of said K users and at least one control component, said control component being dependent on said message word components.

21. A method according to claim 20, in which at least two of said set of message word components have different lengths.

22. A method according to claim 20, in which at least two of said set of message word components have different lengths.

23. A system to transmit data to multiple receiving stations comprising:
a transceiver
an access point transmitter having data processing means for receiving input data for M users and dividing said input data into a set of packets, where M is an integer greater than one;
concatenating said packets into a set of combined message words containing packets for each of said M users;
encoding said combined message words with an error-correcting code to form a multi-user codeword; and
modulating a set of frequency-domain symbols with said multi-user codeword, thereby forming a modulated set of frequency-domain symbols adapted to be transmitted by at least one transmit antenna;
at least one processor configured to transform a modulated set of frequency-domain symbols for each transmit antenna with an inverse fourier transform to form a set of time-domain symbols;
at least one processor configured to append a cyclic prefix to each member of said set of time-domain symbols for each transmit antenna; and
the transceiver configured to transmit said cyclic prefix and said time-domain symbols from said at least one transmit antenna in a multi-user transmitted signal.

24. A system according to claim 23, further comprising:
a receiver, having at least one receive antenna, of an individual one of the M users for receiving said multi-user transmitted signal;
at least one data processor in said receiver configured to remove said cyclic prefix;
at least one processor configured to perform a fourier transform to form a set of received frequency-domain symbols for each receive antenna of said individual user;
circuitry configured to demodulate said received frequency domain symbols for each receive antenna of said individual user;
circuitry configured to decode said frequency-domain symbols with said error-correcting code; and
at least one data processor for separating a set of packets directed at said individual user.

25. A system according to claim 23, in which said set of frequency-domain symbols span a set of orthogonal frequency division multiplex subcarriers within a transmission frequency range of said transceiver, whereby said packets of said M users have frequency diversity of said transmission frequency range and spatial diversity of said at least one transmit antenna.

26. A system according to claim 23, in which said packets of said M users are interleaved before said step of modulating, whereby data from each of said M users is spread in frequency, spread in time, and across said at least one transmit antenna.

27. A system according to claim 23, in which said at least one data processor forms a set of combined message words containing a set of message word components for each of the M users and at least one control component located in at least one member of said set of combined message words, said control component being dependent on a distribution of said message word components within said set of message words.

28. An apparatus comprising:
orthogonal frequency division multiplex downlink circuitry configured to send information to multiple terminals from a single access point;
said circuitry configured to aggregate packets of information for the multiple terminals; and
comprising near-capacity achieving channel coding circuitry configured to encode said aggregated packets into a single error-correction codeword, where assigned time slots corresponding to specific orthogonal frequency division multiplex symbols are used to separate different terminals, and where said near-capacity achieving channel coding circuitry constructs said single error-correction codeword for use with iterative decoding architectures at the multiple terminals.

* * * * *

UNITED STATES PATENT AND TRADEMARK OFFICE
CERTIFICATE OF CORRECTION

PATENT NO. : 7,746,758 B2
APPLICATION NO. : 11/632359
DATED : June 29, 2010
INVENTOR(S) : Victor Stolpman It is certified that error appears in the above-identified patent and that said Letters Patent is hereby corrected as shown below:

Claim 17, col. 15, line 10 delete "Nth".

Signed and Sealed this

Thirty-first Day of August, 2010

David J. Kappos
*Director of the United States Patent and Trademark Office*